(12) United States Patent
Mankovskii et al.

(10) Patent No.: US 9,755,922 B2
(45) Date of Patent: Sep. 5, 2017

(54) MINIMIZED INSTALLATION OF POINT OF PRESENCE SOFTWARE AGENTS BY USE OF PRE-INSTALLED BROWSER

(71) Applicant: CA, INC., New York, NY (US)

(72) Inventors: Taras Mankovskii, Ontario (CA); Serguei Mankovskii, San Ramon, CA (US)

(73) Assignee: CA, INC., New York, NY (US)

( * ) Notice: Subject to any disclaimer, the term of this patent is extended or adjusted under 35 U.S.C. 154(b) by 167 days.

(21) Appl. No.: 14/670,112

(22) Filed: Mar. 26, 2015

(65) Prior Publication Data
US 2016/0285712 A1  Sep. 29, 2016

(51) Int. Cl.
| | | |
|---|---|---|
| G06F 15/173 | (2006.01) |
| H04L 12/26 | (2006.01) |
| H04L 29/08 | (2006.01) |
| G06F 17/30 | (2006.01) |
| G06F 9/445 | (2006.01) |
| H04L 12/24 | (2006.01) |

(52) U.S. Cl.
CPC .............. *H04L 43/065* (2013.01); *G06F 8/60* (2013.01); *G06F 17/3089* (2013.01); *H04L 41/046* (2013.01); *H04L 43/12* (2013.01); *H04L 67/02* (2013.01); *H04L 67/34* (2013.01)

(58) Field of Classification Search
USPC .................. 709/224, 203, 223, 230, 201
See application file for complete search history.

(56) References Cited

U.S. PATENT DOCUMENTS

| | | | | |
|---|---|---|---|---|
| 6,631,407 B1 * | 10/2003 | Mukaiyama | ........ | H04L 41/0213 709/224 |
| 7,725,574 B2 * | 5/2010 | O'Connell | .......... | G06F 11/0709 709/219 |
| 7,792,948 B2 * | 9/2010 | Zhao | ..................... | H04L 41/046 709/224 |
| 7,912,944 B2 * | 3/2011 | Nagai | ................ | G03G 15/5079 709/219 |
| 7,953,791 B2 * | 5/2011 | Or Sim | .................. | H04H 60/31 370/232 |
| 8,019,849 B1 * | 9/2011 | Lopilato | ............... | G06F 17/302 709/203 |
| 8,539,567 B1 * | 9/2013 | Logue | .................... | H04L 63/08 709/223 |
| 9,288,199 B1 * | 3/2016 | Winn | ...................... | H04L 63/08 |
| 2002/0054587 A1 * | 5/2002 | Baker | ................. | G06F 11/0709 370/352 |

(Continued)

Primary Examiner — Michael Y Won
(74) Attorney, Agent, or Firm — Vierra Magen Marcus LLP

(57) ABSTRACT

A multi-device data processing machine system includes a plurality of network-connected cliental servers and an SaaS server that is configured to download by way of the network to the cliental servers of web pages having browser-executable code, the browser-executable code being configured to automatically repeatedly monitor performance attributes of respective ones of the cliental servers and to automatically repeatedly report on results of the monitoring to an SaaS provider associated with the SaaS server. When their corresponding web pages are downloaded into the respective cliental servers, their browser-executable codes function as Point of Presence (POP) agents. Installation of POP agents is reduced to downloading of webpages by way of pre-installed browsers.

12 Claims, 3 Drawing Sheets

(56) References Cited

U.S. PATENT DOCUMENTS

| | | | |
|---|---|---|---|
| 2005/0109831 A1* | 5/2005 | Obara | G06Q 20/18 235/379 |
| 2007/0079282 A1* | 4/2007 | Nachnani | G06F 8/34 717/106 |
| 2007/0226334 A1* | 9/2007 | Aoyagi | H04W 8/245 709/224 |
| 2009/0187970 A1* | 7/2009 | Mower | H04L 67/025 726/3 |
| 2011/0296401 A1* | 12/2011 | DePoy | G06F 8/60 717/174 |
| 2012/0124193 A1* | 5/2012 | Ebrahim | H04L 41/0663 709/224 |
| 2012/0150992 A1* | 6/2012 | Mays | G06F 9/4443 709/217 |
| 2012/0166616 A1* | 6/2012 | Meehan | G06Q 10/0639 709/224 |
| 2012/0226749 A1* | 9/2012 | Dale | G06Q 50/01 709/204 |
| 2013/0086557 A1* | 4/2013 | Alwar | G06Q 10/101 717/127 |
| 2014/0075017 A1* | 3/2014 | Wang | G06F 9/50 709/224 |
| 2014/0095577 A1* | 4/2014 | Root | G06F 19/3412 709/202 |
| 2014/0156349 A1* | 6/2014 | McLoughlin | G06Q 30/0203 705/7.32 |
| 2014/0222899 A1* | 8/2014 | Supramaniam | H04L 67/42 709/203 |
| 2015/0106500 A1* | 4/2015 | Fakhouri | H04L 67/34 709/224 |
| 2015/0288702 A1* | 10/2015 | Choe | H04L 63/20 726/1 |
| 2016/0014010 A1* | 1/2016 | Della Corte | H04L 43/04 709/224 |
| 2016/0283936 A1* | 9/2016 | Daniel | G06Q 20/3672 |

* cited by examiner

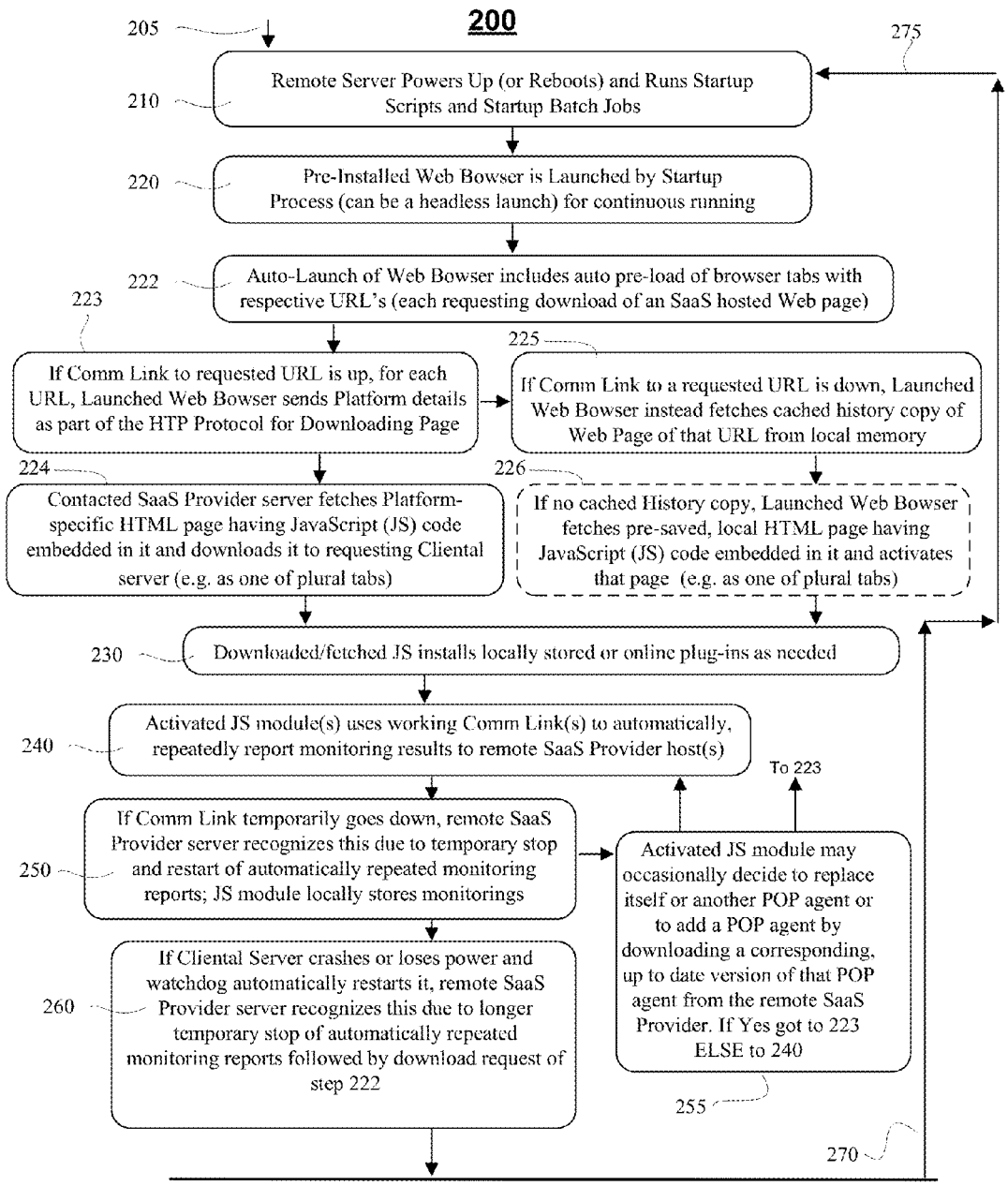

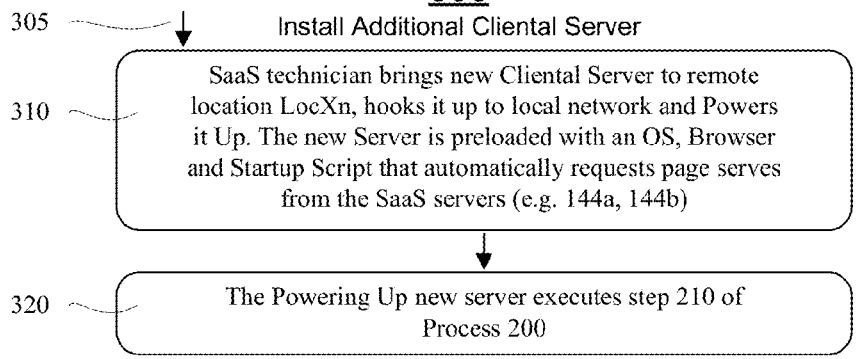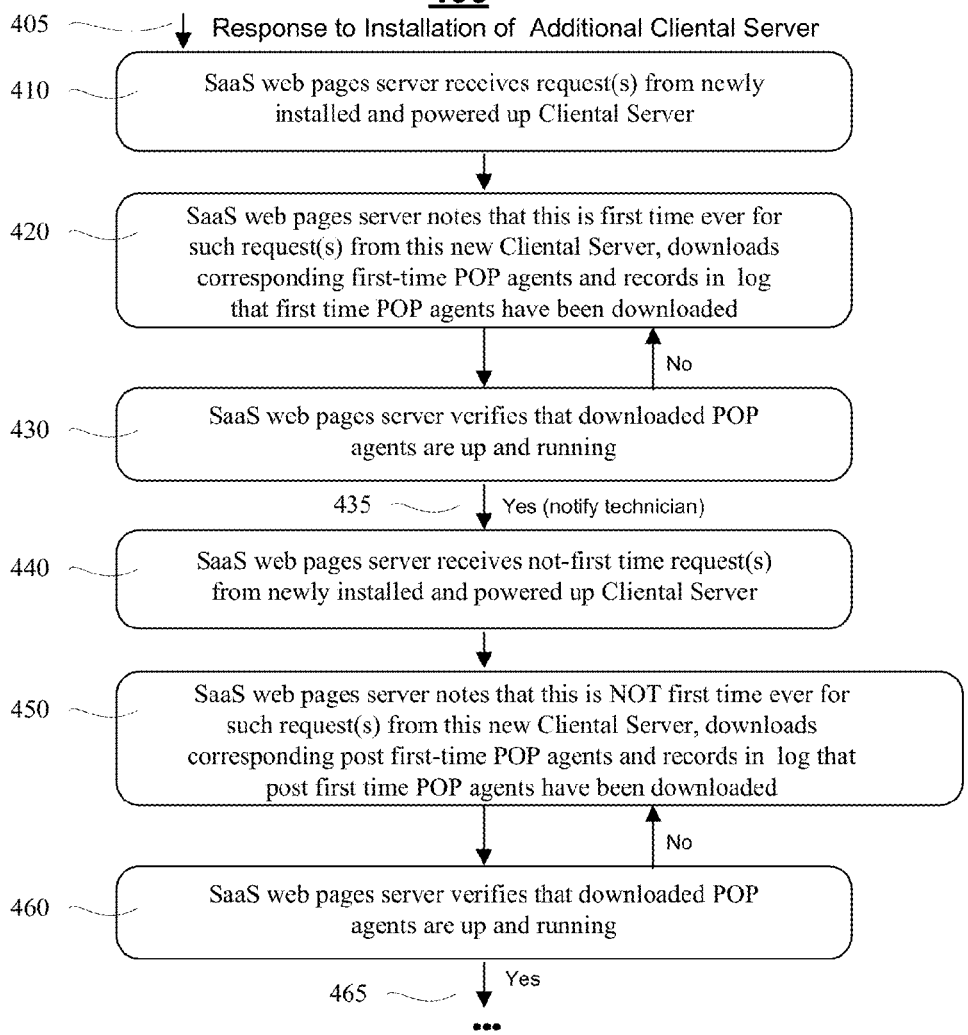

MINIMIZED INSTALLATION OF POINT OF PRESENCE SOFTWARE AGENTS BY USE OF PRE-INSTALLED BROWSER

FIELD OF DISCLOSURE

The present disclosure relates generally to enterprise wide resource performance monitoring and management and more specifically to machine-implemented methods for reducing an amount of manual labor used for installing new or additional or updated Point of Presence (POP) software agents into remotely located enterprise servers and into newly added servers. The present disclosure allows for simplified Software-As-A-Service (SaaS) implementation of enterprise wide performance analytics and resource management.

DESCRIPTION OF RELATED TECHNOLOGY

Large enterprises (e.g., business organizations) typically employ outside support entities (sometimes referred to as SaaS providers, where SaaS refers to Software-As-A-Service) for handling the day-to-day details of managing enterprise wide software and hardware resources. This frees employees of the business or other enterprise to focus on their core mission (e.g., core business goals) rather than expending their energies on managing all detailed aspects of enterprise wide software and hardware resources.

By way of a hypothetical example, consider a large business enterprise; say, an online books-and-other products selling company fictitiously called Amazem.com. It's core business is selling books-and-other products by way of the Internet and making sure its customers are satisfied and come back for repeat business. Amazem.com may rely on a large scale "cloud" computing environment for delivering to its customers and to its customer support personnel a variety of always-on web services and tools. As those skilled in the art of cloud computing will appreciate, a "cloud" may be implemented as a geographically distributed and network interconnected array of physical data processing servers (hereafter also "cliental servers") that often host reconfigurable "virtual" servers and "virtual" software modules as well as "virtual"—and thus reconfigurable—communication capabilities.

When appropriately implemented and maintained, the "cloud" appears to operate as a relatively seamless and crash-proof mesh of hot-plug wise replaceable servers, storage units, communication units and the like. Point failures of specific physical units within a physical layer of the cloud or of specific virtual units within the supported virtual layers are easily and almost instantly repaired by shifting the supported virtual functionalities to spare other support portions of the physical and/or virtual layers. Because of sheer size of the cloud and also because of the constantly shifting and self-reconfiguring fabric of resources, it can be very difficult to spot and repair or prevent problems, such as for example that of system resources being unnecessarily (inefficiently) wasted, such as that of emerging problems of major significance arising in different parts of the cloud and such as that of additional resources having to be added to different parts of the cloud due to growing business needs. Thus large enterprises (e.g., the fictitious Amazem.com) typically outsource the task of detailed cloud maintenance to offsite, SaaS resource management providers to watch (monitor) their hardware and software systems for them and to proactively manage them so as to keep the data processing/communications portions of the business running smoothly without loss or degradation of service to end-use customers. In this way the business enterprise can focus on its core business and keep its customers (end-users) happy.

In order to carry out their delegated tasks, SaaS resource management providers generally need to install POP (Point of Presence) agent software modules into all the physical servers of their cliental (e.g., the cloud based online business enterprise). Installation can be very labor intensive and time consuming. Typically a service technician must be dispatched to the physical location of each server and must employ a complicated set of manually required operations to "install" each additional POP agent into the specific Operating System (OS) of each server while at the same time bypassing various security fences (e.g., firewalls) present at that installation site. Every installation site can have a variety of different OS'es (e.g., Linux™, Unix™, Microsoft Windows™, Apple iOS™, etc.) in use and a variety of different security fences. Different approaches are typically needed for each combination of unique OS and unique security fences. Thus installation of POP agent software modules can be very expensive, time consuming and because it is done manually, prone to human error.

It is to be understood that this background of the technology section is intended to provide useful background for understanding the here disclosed technology and as such, this technology background section may include ideas, concepts or recognitions that were not part of what was known or appreciated by those skilled in the pertinent art prior to corresponding invention dates of subject matter disclosed herein.

SUMMARY

Structures and methods are provided in accordance with the present disclosure for minimizing manual portions of the job of installing POP (Point of Presence) agent software modules into all physical servers of SaaS serviced cliental and keeping those installed POP agents up to date.

In accordance with one aspect of the present disclosure, each cliental server is initially provided with a respective operating system (OS) and an integrated web browser structured to cooperatively interact with the respective OS and extended (by way of appropriate browser extensions and/or plugins and/or add-ons) to enable browser-executed code to access hardware resources and other software resources of the local server such that the extension/plug-in enhanced browser-executed code (e.g., JavaScript™) can perform Point of Presence (POP) monitoring and managing of local hardware and software resources of the cliental server in which it resides substantially as would otherwise-installed Point of Presence (POP) software agents. The extensions and/or plugins may include one or more hardware access enabling extensions such as ActiveX Controls, Java Applets, JavaBeans, Enterprise JavaBeans, JavaSandbox modifiers (e.g., modified applet class loader, modified Java byte code verifier and modified Java security manager) and other Sandbox Barrier Crossing technologies. In one embodiment, the browser is HTML5 compatible. (HTML5 compatibility eases the ability of browser-executable code to access local hardware and others of local software components.) Each cliental server is further provided with a startup/reboot procedure that automatically launches the browser and causes the browser to automatically request download of one or more web pages from a corresponding one or more SaaS (Software as a Service) web hosts. The downloaded web pages include JavaScript (JS) and/or other embedded and browser-executable code portions that acquire permissions (e.g., by way of appropriate browser plug-ins or extensions) for monitoring and/or managing substantially all aspects of the cliental server because the integrated and extended web browser has those permissions to begin with. Accordingly the JavaScript (JS) and/or other embedded executable code portions of the downloaded web pages begin to operate as installed POP agents for the host SaaS provider as soon as they are downloaded and without need for specialized manual installment and bypass of security fences. That is so because integrated, pre-extended web browser is already installed, configured to cooperatively interact with the OS and is already inside the security fences and has access to hardware resources and other local software components of the local server.

A machine-implemented, remote monitoring method in accordance with the present disclosure comprises: automatically causing a launching and/or continued running in a to-be-monitored first server having a pre-installed first operating system (OS1), of a pre-installed first network browser (B1) that is configured for cooperative interaction with the installed first operating system; automatically causing the launched and continuously running first browser (B1) to request from a pre-specified SaaS provider, download of at least one web page containing browser-executable code that is executable by the first browser and can access hardware resources within a domain of the of the first operating system, the browser-executable code being configured to automatically repeatedly monitor one or more operational attributes of the to-be-monitored first server and to automatically repeatedly report to the pre-specified SaaS provider on the results of the monitoring of the first server; and automatically verifying that the requested at least one web page has successfully downloaded into the first server, and if yes activating the browser-executable code of the at least one web page so as to thereby initiate the corresponding automatically repeated and continuous monitoring of the one or more operational attributes of the first server and the corresponding automatically repeated reporting to the pre-specified SaaS provider on the results of the monitoring. The machine-implemented, remote monitoring method further comprises: automatically causing a launching and/or continued running in a to-be-monitored second server having a pre-installed second operating system, of a pre-installed second network browser (B2) that is configured for cooperative interaction with the installed second operating system (OS2, where the second OS is different from OS1); automatically causing the launched second browser to request from the pre-specified SaaS provider, download of at least a second web page containing browser-executable code that is executable by the second browser (B2) and can access hardware resources within a domain of the of the second operating system, the browser-executable code being configured to automatically repeatedly and continuously monitor one or more operational attributes of the to-be-monitored second server and to automatically repeatedly report to the pre-specified SaaS provider on the results of the monitoring of the second server; and automatically verifying that the requested at least second web page has successfully downloaded into the second server, and if yes activating the browser-executable code of the at least second web page so as to thereby initiate the corresponding automatically repeated and continuous monitoring of the one or more operational attributes of the second server and the corresponding automatically repeated reporting to the pre-specified SaaS provider on the results of the monitoring of the second server.

Other aspects of the disclosure will become apparent from the below detailed description.

BRIEF DESCRIPTION OF THE DRAWINGS

The below detailed description section makes reference to the accompanying drawings, in which:

FIG. 2 is a flow chart depicting an automated process for installing up to date POP agents as browser-executable code and using them to monitor and/or manage corresponding cliental servers;

FIG. 3 is a flow chart depicting a method of adding hardware and installing POP agents into it; and FIG. 4 is a flow chart depicting an automated process for changing POP agents installed in a remote server.

DETAILED DESCRIPTION

Figure 1:
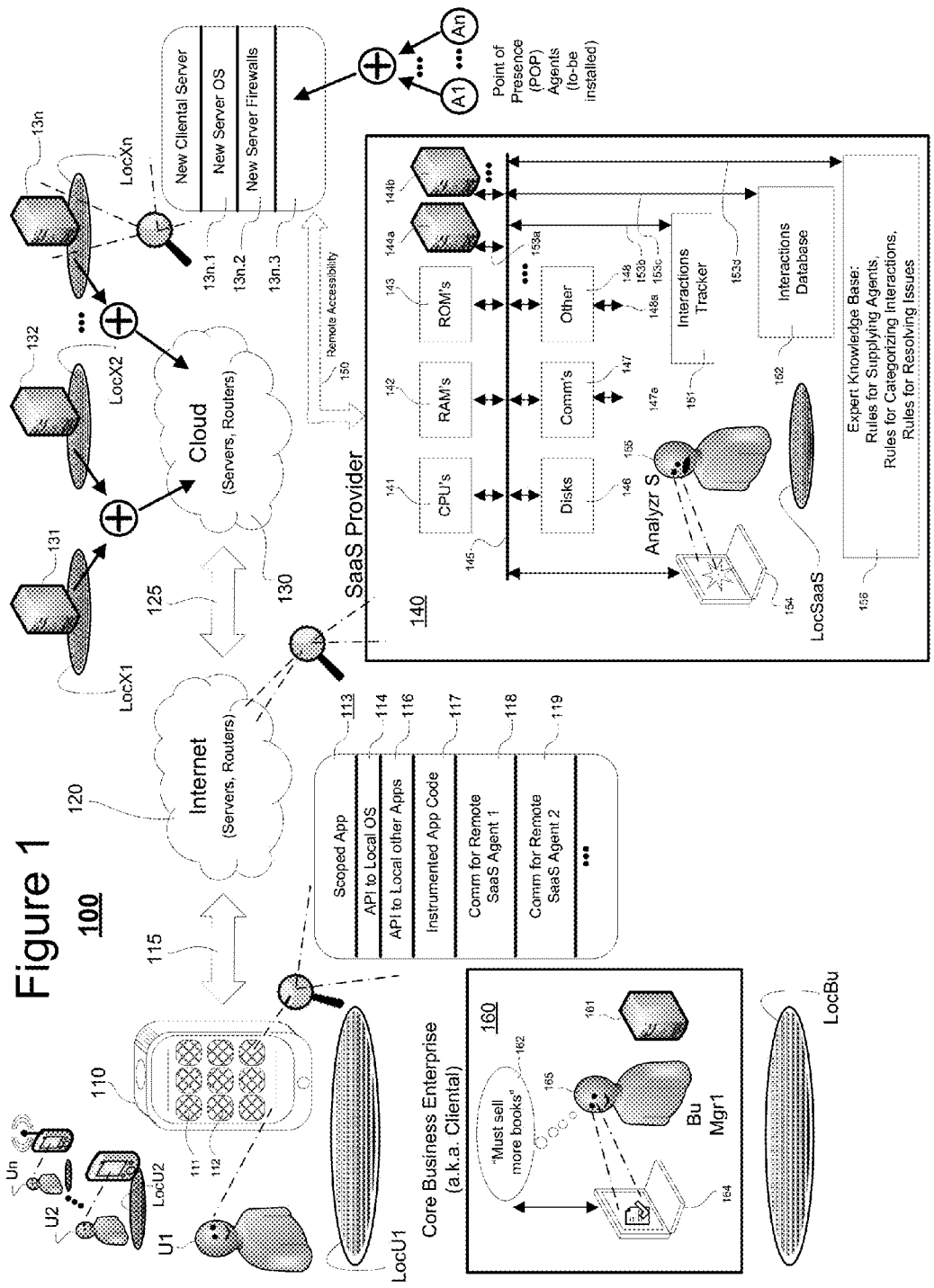
FIG. 1 is a block diagram schematically showing an interconnected multi-device enterprise system which includes a mechanism for enabling an SaaS provider to remotely install POP (Point of Presence) agent software modules into all physical data processing units (e.g., servers) of an SaaS serviced enterprise and to keep those installed POP agents up to date.

FIG. 1 is a block diagram showing an integrated client-server/internet/cloud system 100 (or more generically, an integrated multi-device system 100) to which the here disclosed technology may be applied. System 100 may also be referred to as an SaaS serviced, distributed resources, machine system in which there are provided a variety of differently-located data processing and data communication mechanisms including for example, customer-sited units (e.g., wireless smartphone 110) configured to allow end-users thereof (e.g., U1) to request from respective end-user occupied locations (e.g., LocU1) services from differently located enterprise hosts (e.g., in-cloud servers 131, 132, . . . 13n having respective siting locations LocX1, LocX2, . . . , LocXn). There is further provided an enterprise resources monitoring and managing center (SaaS 140) tasked with the job of monitoring all mission-vital points within the system 100 and with the job of managing corresponding hardware and software portions so that pre-specified goals of an end-users servicing enterprise (160, also 'cliental' of the SaaS) can be realized without any undue interruptions in service and achievement of those goals.

It is to be understood that the illustrated system 100 is merely exemplary. As indicated, it comprises at least a few, but more typically a very large number (e.g., thousands) of end-user devices 110 (only a few shown in the form of wireless smartphones but understood to represent many similarly situated mobile and/or stationary client machines—including the smartphone wireless client kinds and cable-connected desktop kinds). These end-user devices 110 are capable of originating service requests which are ultimately forwarded to service-providing host machines (e.g., in-cloud servers 131, 132, . . . 13n) within a cloud environment. Results from the service-providing host machines are thereafter typically returned to the end-user devices 110 and displayed or otherwise communicated to the end-users (e.g., U1, U2, . . . , Un). For example, if the business enterprise 160 is an online book selling one, the end-user (U1) may have installed on his/her smartphone (110) a software application ("app") that automatically requests from the enterprise, a list of new books that may be of current interest to the end-user (U1). In response to the request, enterprise software and hardware modules automatically identify the user, pull up a user profile, search for matching new books, and then within a very short time (e.g., a minute or less), communicate back the list for almost instant playout on the end-user's device 110. The end-user may then click on one of the offered selections and instantly purchase the book.

Aside from the end-user devices (e.g., 110) and the cloud servers (e.g., 131, 132, . . . , 13n) the system 100 comprises: one or more wired and/or wireless communication fabrics 115 (only one shown in the form of a wireless bidirectional interconnect) coupling the end-user client(s) 110 to networked servers 120 (not explicitly shown, and can be part of an Intranet or the Internet) where the latter may operatively couple by way of further wired and/or wireless communication fabrics 125 (not explicitly shown) to further networked servers 130 (e.g., 131, 132, . . . 13n).

The second set of networked servers 130 is depicted as a "cloud" 130 for the purpose of indicating a nebulous and constantly shifting, evolving set of hardware, firmware and software resources. In-the-cloud resources are typically used by large scale enterprise operations (e.g., core business enterprise 160) for the purpose of keeping mission critical tasks going without undue interruptions. As those skilled in the art of cloud computing appreciate, the "cloud" 130 may be implemented as reconfigurable virtual servers and virtual software modules implemented across a relatively seamless web of physical servers, storage units (including flash BIOS units and optical and/or magnetic storage units), communication units and the like such that point failure of specific units within the physical layer are overcome by shifting the supported virtual resources to spare other support areas in the physical layer. Because of sheer size and also the constantly shifting and self-reconfiguring fabric of resources, it can be very difficult to monitor and manage all the hardware and software resources of the system 100. The latter task is often delegated to an SaaS services provider (e.g., 140).

Still referring to FIG. 1, a quick and introductory walk through is provided here so that readers may appreciate the bird's eye lay of the land, so to speak. Item 111 represents a first user-activatable software application (first mobile app) that may be launched from within the exemplary mobile client 110 (e.g., a smartphone, but could instead be a tablet, a laptop, a wearable computing device; i.e. smartwatch or other). Item 112 represents a second such user-activatable software application (second mobile app) and generally there are many more. Each end-user installed application (e.g., 111, 113) can come in the form of non-transiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 115 and/or 125. Each app (e.g., 111, 112) may come from a different business or other enterprise (e.g., 160, only one shown) and may require the assistance of various and different online resources (e.g., Internet, Intranet and/or cloud computing resources). Generally, each enterprise is responsible for maintaining in good operating order its portions of the (e.g., Internet, Intranet and/or cloud computing resources). For sake of simplicity it is assumed here that there is just one enterprise 160 and that it has hired just one SaaS provider 140 to manage all of its online resources. In the more practical world, plural business or other enterprises can pool parts of their resources into a common core of resources that are watched over by a single SaaS provider 140 so as to reduce operating costs.

One example of a first mobile app (e.g., 111) could be one that has been designed to serve as an enterprise-wide customer support service (and/or support for other forms of recipient-targeting communications, e.g., collaborative project support software). In one example, a particular business organization (e.g., Chain #1 Online Book Stores) may wish to encourage a useful flow of information (e.g., which books are best sellers?, who has more in stock?, etc.) between its personnel and customers so as to increase sales. It is important that the utilized online resources remain working at all times and for as many customer-occupied locations (e.g., LocU1) as possible. More specifically, smartphone 110 may rely on a cellular telephony service providing portion of communications fabric 115 where communications capabilities may be limited in certain remote locations. It may be beneficial for the app provider/supporter (e.g., enterprise 160 and/or SaaS provider 140) to know that and to custom tailor how the app operates when used at different end-user locations (e.g., LocU1, LocU2) so that each end-user has a satisfactory experience with use of the app.

In one embodiment, one or more of the mobile apps are instrumented so that in the background they provide useful quality control data that can be picked up by the SaaS provider 140 for monitoring performance, where pickup of the quality control data may occur at different locations (e.g., LocX1, LocX2, . . . , LocXn) throughout the enterprise. An example of an instrumented or 'scoped app' is depicted at 113. It includes an API interface 114 to the local operating system (e.g., Apple iOS™ or Android™). It may include further API's 116 to other local apps. It may further include instrumented execution code 117 where the instrumented part causes various pieces of meta-data to be embedded in the back and forth communication packets of the device 110. Examples of such embedded meta-data may include indications of time of service-request, complexity/size of service-request, location where service-request was launched from, type of local OS, ID of cellular carrier and so forth. This embedded meta-data is picked up by backend enterprise servers and by monitoring agents thereof (e.g., 13n.3: A1-An) which are embedded in the backend enterprise servers. the picked up meta-data is used for determining system performance (for example, how long did it take from time of end-user request to complete the requested service?). In more detail, some of the embedded meta-data may be targeted for use by a first SaaS backend agent as indicated at 118 and some targeted for use by a second SaaS backend agent as indicated at 119.

Mobile apps (e.g., 113), mobile operating systems (see 114), end-user devices (e.g., 110) and communication modalities (e.g., 115) are constantly changing, meaning that SaaS providers (e.g., 140) need to be constantly updating their installed agents (e.g., 13.n3), adding new ones into backend servers 120/130 and; due to constant growth of business needs, adding new cliental servers and installing fresh and updatable agents into those as well. The present disclosure provides methods and systems for doing so with minimal manual effort.

Typically, large systems such as 100 are subdivided into management-defined "sections". The size and resources inventory of each section is left to mangers of the system, but generally each section; where 140 is used here as an example of a system section, includes a limited number of intercoupled, "local" resources such as one or more local data processing units (e.g., CPU's 141), one or more local data storage units (e.g., RAM's 142, ROM's 143, Disks 146), one or more local data communication units (e.g., COMM units 147), and a local backbone (e.g., local bus 145) that operatively couples them together as well as optionally coupling them to yet further ones of local resources 148. The other local resources 148 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals (e.g., 154) and so on.

It is to be understood that various ones of the merely exemplary and illustrated, "local" resource units (e.g., 141-148) may include or may be differentiated into more refined kinds. For example, the local CPU's (only one shown as 141) may include single core, multicore and integrated-with-GPU kinds. The local storage units (e.g., 142, 143, 146) may include high speed SRAM, DRAM kinds as well as configured for reprogrammable, nonvolatile solid state data storage (SSD) and/or magnetic and/or other phase change kinds. The local communication-implementing units (only one shown as 147) may operatively couple to various external data communicating links such as serial, parallel, optical, wired or wireless kinds typically operating in accordance with various ones of predetermined communication protocols (e.g., internet transfer protocols, TCP/IP). Similarly, the other local resources (only one shown as 148) may operatively couple to various external electromagnetic or other linkages 148a and typically operate in accordance with various ones of predetermined operating protocols. Additionally, various kinds of local software and/or firmware may be operatively installed in one or more of the local storage units (e.g., 142, 143, 146) for execution by the local data processing units (e.g., 141) and for operative interaction with one another. The various kinds of local software and/or firmware may include different operating systems (OS's), various security features (e.g., firewalls), different networking programs (e.g., web browsers), different application programs (e.g., word processing, emailing, spreadsheet, databases, etc.) and so on. A further example of such locally installed software and/or firmware units is shown in the magnification for cloud server 13n, where that server 13n includes a respective server OS 13n.1 operatively installed therein and respective server security fences (e.g., firewalls) 13n.2 operatively installed therein. Not explicitly shown but also operatively installed in a behind-the-security-fences area 13n.3 of the server 13n is an operative browser (e.g., a web browser) that is configured to cooperatively interact with the local OS 13n.1 and with local network communication resources (not shown, see instead 147 of section 140). In one class of embodiments, the installed browser is provided with an ability to access hardware and software resources outside of the normal browser "sandbox" so that the browser, if appropriately instrumented, can provide monitoring and management of the behaviors of local hardware and software resources of the server 13n.

The expected "normal" behaviors for various local resources in each system section, for example units 141-148 of local section 140 are defined by system planning managers of the system 100. Typically they do not envisage and plan for viral waves of section stressing service requests (e.g., from the hundreds or thousands of mobile devices 110 of the mobile end-users (e.g., U1, U2, . . . , Un). However, the unexpected can and does happen. To ward off catastrophic failures of enterprise critical resources, the SaaS provider (e.g., 140) wants to embed into basically every cliental server (e.g., 131-13n), resource monitoring and managing software agents (e.g., A1-An) which operate as Point of Presence (POP) agents. Such POP agents can allow a remotely located SaaS analyzer (e.g., 155) to spot emerging problems (represented by the star burst on the screen of terminal 154) and to try an mitigate them without having to be physically present at the location (e.g., LocX1, LocX2, . . . , LocXn) of every server. It is to be understood that the illustrated human analyzer 155 can be replaced by an automated analyzer which relies for example on an expert ruled knowledge database 156 for among other things, accessing over-time developed rules (e.g., heuristically developed rules) for resolving different issues within the monitored system 100. To have such ability to remotely access cliental server hardware and software for purpose of monitoring and managing the same (where remote access capabilities are schematically represented as 150) the SaaS provider 140 must somehow operatively install its POP agents (e.g., A1-An) into a region like 13n.3 which is inside the security fences 13n.2 of the server and the provider 140 must somehow cause the POP agents (e.g., A1-An) to be cooperatively interoperative with the local operating system (e.g., OS 13n.1) and to have monitoring and/or managing access to various hardware and software resources within the remote cliental server 13n.

As mentioned above, installation of POP agents can be very labor intensive and time consuming. Typically a service technician must be dispatched to the physical location (e.g., LocXn) of each server (e.g., 131-131n) and must employ a complicated set of manually required operations to operatively "install" each additional POP agent (e.g., An) so it is cooperative with the specific and local Operating System (e.g., OS 13n.1) of each server while at the same time bypassing various security fences (e.g., firewalls 13n.2) present at that installation site. Every installation site can have a variety of different OS'es (e.g., Linux™, Unix™, Microsoft Windows™, Apple iOS™, etc.) in use and a variety of different security fences. Different approaches are typically needed for each combination of unique OS and unique security fences. Thus installation of POP agent software modules can be very expensive, time consuming and because it is typically done manually, prone to human error.

Referring to FIG. 2, a machine-implemented method 200 of installing and utilizing POP agents in accordance with the present disclosure is described. As will become apparent from FIG. 2, the process 200 is presaged by the installation of a power-up or reboot start-up script. Storage space for batch process and/or other types power-up or reboot start-up scripts are generally included as part of the operating system installation (e.g., installed in area 13n.1 of FIG. 1) and means for allowing a SaaS provider 140 to remote in and add one or more start-up commands into one or more of the local power-up/reboot start-up scripts are known. Alternatively, the local power-up/reboot start-up scripts may be manually installed by an on-site technician.

In FIG. 2, initial entry may be made at 205 into machine-implemented, and automatically repeatable step 210. In step 210, the local server (cliental server such as 13n of FIG. 1) is either powering up or rebooting. Part of the powerup/reboot process is an automatic execution of one or more batch or other startup scripts. The startup script includes a command (step 220) to launch a pre-installed browser program and to keep it continuously running (except of course if the local server crashes or experiences a forced shut down). The launched browser program is pre-configured to cooperatively operate with the local operating system and to automatically use local communication resources (see 147 of FIG. 1) for establishing a link with the Internet and/or a substitute networking medium. Additionally, the launched browser program can be configured, if properly instrumented, to gain access to hardware and software resources within the domain of the local operating system. In one embodiment, the launching of the browser includes an instruction for it to run "headless" as well as continuously, meaning that it does not bother to activate a graphical user interface (GUI) and/or library components therefor because there will be no local human given permission to look at the outputs of such a GUI or more importantly to use such a GUI to interfere with operations of the headless browser. In an alternate embodiment, the launching of the browser includes an instruction for its GUI components to drive a null display device. Irrespective of what is done with respect to the GUI components (run headless or run with an unused head), the activated library components include those for executing supplied JavaScript code (JS code) and/or another such form of browser-executable code (e.g., Java applet code, ActiveX code) and those for accessing objects of the local OS whereby the executing JS or other browser-executable code can gain monitoring and/or managing access to all the objects within the domain of the operating system of the local server.

Referring to step 222, the automatic launching of the pre-installed browser includes an automated launching instruction for the browser (after it has automatically established a communication link to the outside world) to output an HTTP(S) (HyperText Transfer Protocol (optionally Secured)) request to one or more pre-identified web page serving hosts (e.g., SaaS provider-controlled hosts, for example 144a, 144b; where the identifications can be URL identifications) for download of a corresponding one or more HTML/JS encoded web pages for running in respective page tabs of the launched and continuously kept running, browser. It is to be understood that at least one of the SaaS provider-controlled hosts (e.g., 144a, 144b) stores a plurality of different ones of the one or more HTML/JS encoded web pages, the stored different HTML/JS encoded web pages corresponding to different operating systems that can be present in the cliental servers (e.g., 131-13n) and/or corresponding to different hardware and/or software configurations that can be present in the cliental servers (e.g., 131-13n).

Referring to step 223, if the communication link to the addressed (e.g., URL addressed) server or server portion of the SaaS provider 140 is up and the addressed server or server portion is working, the addressed SaaS provider-controlled server/portion will extract from the uploaded HTTP(s) request, information about the requesting cliental server (e.g., 13n) including its unique identity (e.g., IP address) and the types of OS and browser that it is currently running with.

Referring to step 224, in response to the extracted information (e.g., requestor ID and requestor OS/browser details), the addressed SaaS provider-controlled server/portion (e.g., 144a) fetches a for-destination tailored first web page that has appropriate HTML and embedded JavaScript code (JS code) and/or other browser-executable code in it (e.g., Java Applet code, ActiveX code etc.) and downloads that page to the requestor (cliental server 13n in this case). In one embodiment, the fetching of the for-destination tailored first web page includes a step (not shown) of consulting an expert knowledge database 156 maintained by the SaaS provider 140. The expert knowledge database 156 may include context based rules for automatically determining which for-destination tailored first web page to fetch. Merely for sake of example such an expert rule might read as follows: IF Requestor is powering up for first time AND Today is a Weekday THEN Fetch Power_first_Web_Page1.01 for download ELSE IF Requestor is powering up or rebooting not for first time AND Today is a Weekend THEN Fetch Power_second_Web_Page2.02 ELSE . . . . The SaaS provider-controlled server/portion (e.g., 144a) can determine from a log it keeps of activities of its monitored cliental servers (e.g., 131-13n) whether this is a first time power up or a thereafter powerup or more likely a reboot based on past history of the requestor (e.g., 13n). In other words, a context appropriate version of browser-executable code (e.g., JS code) is automatically downloaded for installation and running within one of the open tabs of the launched browser. Each opened tab may sport a different downloaded page having JS or other browser-executable code that is executed substantially concurrently with that of the other tabs. For example, one browser tab may be dedicated to hosting POP code that automatically repeatedly checks on the health of the local communication resources within the cliental server (e.g., 13n) and automatically, repeatedly reports such monitoring results back to a corresponding one of the SaaS provider-controlled server/portions (e.g., 144b). Another of the browser tabs may be dedicated to hosting POP code that repeatedly checks on the health of the local nonvolatile or volatile data storage resources within the cliental server (e.g., 13n) and automatically, repeatedly reports the same back to a corresponding one of the SaaS provider-controlled server/portions (e.g., 144a). Yet another may be dedicated to hosting POP code that repeatedly checks on performance attributes (e.g., used percentage of maximum data processing capability, times of peaks and lulls of such usage, etc.) of the local data processing resources within the cliental server (e.g., 13n) and automatically, repeatedly reports the same back to a corresponding one of the SaaS provider-controlled server/portions. A further browser tabs may be dedicated to hosting POP code that repeatedly checks on the identifications and health of the other POP agents present in the same server, for example version numbers and whether running or stalled; and so on. At least one of the opened tabs of the launched browser may be occupied by browser-executing code that automatically and repeatedly checks in (e.g., pings) with a corresponding one of the SaaS provider-controlled server/portions and asks for commands to execute that will reconfigure the local cliental server (e.g., 13n) or cause it to reboot. The pinged SaaS server (e.g., 144a) may return a null command or an actionable command. If a reboot is commanded, re-entry into step 210 is made by way of not-first-time path 275 and new POP agent code is loaded into all the tabs of the re-launched browser of the local cliental server (e.g., 13n).

Referring to step 230, as one option each tab-occupying POP agent may automatically determine that the local browser is missing one or more plug-ins needed for operations of that tab (e.g., for gaining access to hardware and or software portions of the local server). The executing POP agent then automatically installs the missing plug-in (e.g., Java machine plug-in, Java Applet plug-in, ActiveX engine, etc.) from a pre-loaded local storage of the cliental server (e.g., 13n) or fetches it from a trusted online source. In this way a so-installed POP agent can reconfigure the browser in whose sandbox it is running so that the installed POP agent can have access to hardware and/or software portions of the local server. By access to hardware and/or software portions of the local server it is meant here that the installed POP agent can use its ability to access such hardware and/or software portions for the purpose of reconfiguring them when commanded to do so by the SaaS provider 140 and/or the installed POP agent can dynamically obtain current performance measures for the hardware and/or software portions of the local server such as percentage of memory utilization or absolute values for memory utilization where the measured utilization can be in terms of storage capacity (e.g., percent of max free, percent of max unusable, percent of max used) or in terms of data transfer rates (e.g., average percent of max read rate, peak percent of max read rate, average percent of max write rate, peak percent of max write rate, etc.). Further but not limiting examples of obtainable current performance measures include CPU utilization (e.g., average percent of max instruction execution rate, peak percent of max instruction execution rate, etc.); local data bus utilization (e.g., average percent of max data transfer rate); local communication modules utilization (e.g., average percent of max data transfer rate); local references to commonly used software routines (e.g., average rate of invocation of software routine X); and so on. The POP agents allow the SaaS provider 140 to access substantially all of various aspects and attributes of the cliental server remotely as if the SaaS provider 140 were physically at the remote site.

It is to be noted that the present discussion made a subtle switch from describing the downloaded web pages as JS encoded ones (or otherwise browser-executable encoded ones—e.g. Java applet code, ActiveX code) to that of being POP agents. This is so because JavaScript (or other substitute browser-executable codes) are sufficiently robust to encode the functions of desired POP agents, usually as well as other programming codes except that many programming codes cannot run as is in the typical browser sandbox while on the other hand, a select number of programming codes like JavaScript, Java™ (Java is a trademarked language claimed by the Oracle corporation and is not to be confused with JS) can run as is in many a popular browsers, including, but not limited to more modern and HTML5 compatible ones such as, Microsoft's Internet Explorer™ (IE), Google's Chrome™ browser, Mozilla's FireFox™ browser, Apple's Safari™ and so on. Thus, by switching to use of browser-executable code that is executable in substantially all of the major modern browsers rather than using a proprietary programming code for defining the desired POP agent, it is possible to establish an installed and running (code executing) POP agent inside the local server without having to bypass security fences (e.g., firewalls) of the local cliental server (e.g., 13n). Stated otherwise, the present disclosure has revealed how to get SaaS-sourced, POP agents like A1-An of FIG. 1 installed in area 13n.3 (inside the firewalls) without having to pass through those security fences and without having to go through the intricacies of freshly installing a new program by way of the registry or other program accepting components of the local operating system (e.g., 13n.1). Appropriate plug-ins for accessing local hardware and software outside the sandbox of the browser are understood to be utilized in this context.

Referring to step 225, it is possible at times that an attempt to execute step 224 fails because the network link is temporarily down. In such a case, control is passed to step 225 where the browser instead fetches the most recently used version of the corresponding web page from its history cache. While not necessarily being fully up to date, that cached version of the desired web page is likely to be fairly close in functionalities to the one that cannot at the moment be downloaded due to the temporary inoperability of a needed network link. Then when the needed network link is detected to be back up and running, an automated update checker portion (255) among the running POP agents detects that a newer version is available, and causes an automated download and activation of that newer version. Each time a download is requested, the local browser test to assure that the download was successful. If not, the browser may automatically repeat the request until a successful download occurs.

Referring to step 226, it is possible at times that there is no substitute web page in the browser history cache. In that case a substitute web page is fetched from a predefined folder in the local client server and used as such until the needed link comes back up. In some embodiments, step 226 is left out and step 225 instead links into step 230 and/or step 240.

The plug-ins fetching operations of step 230 have already been described above. Referring to step 240, all the currently installed POP agents continue to run in their respective tab spaces and either automatically repeatedly send monitoring results back to their respective portions of the SaaS provider hosts (e.g., 144a, 144b) or fetch new commands or null commands from their respective portions of the SaaS provider hosts as long as the corresponding network links remain operational the launched browser continues to run.

Referring to step 250, it is possible at times that one or more of the network communication links temporarily becomes inoperative (e.g., due to congestion, interference, a mobile device temporarily moving out of range of a cellular tower, etc.). This possibility is recognized at both the web hosting side of the SaaS provider 140 and the web page executing side of the respective cliental servers (e.g., 131-13n). In accordance with one aspect of the present disclosure, both sides (SaaS and cliental server) are provided with expert knowledge or other appropriate intelligence means for determining how long to wait before deciding that the network communication link problem is not merely a temporary one. When it is determined on the SaaS provider side (140) that a network communication link problem is not merely a temporary one because one or more of the remote POP agents have stopped sending in their automatically repeated monitoring reports for more than a predetermined outage duration, then that becomes an alert for the SaaS provider 140 that not only does the enterprise have a network communication link problem but also an indication as to which of the cliental servers (e.g., 130-13n) are cut off due to that problem. The SaaS provider 140 may then automatically or manually take appropriate steps for trying to resolve the network communication link problem. Similarly, at each cliental server site (e.g., LocX1-LocXn) that does not receive for more than a predetermined time duration, expected and automatically repeated acknowledgement pings (e.g., null commands) or actual commands from the respective web hosting portion of the SaaS provider 140, it is automatically determined based on the loss of feedback pings for that duration that the corresponding network communication link problem is more than a temporary one and the POP agent takes remedial action on its own. One such possible remedial action is to buffer its monitoring reports or summaries of them into a pre-specified crash dump file which the SaaS provider 140 may later review after the lost link is brought back up again.

On the other hand, at the local cliental server side (e.g., 13n) and before it is determined there-at (e.g., in step 250) that the recognized loss of communication with the SaaS provider 140 is more than a temporary one, the POP agents that are responsible for sending their respective monitoring reports back to the SaaS provider 140, automatically request and get extended memory spaces for their respective report-holding buffers (not shown) where the extended memory spaces are respectively large enough to store respective monitoring reports of the POP agents for respective durations of link loss of respectively historically normal durations plus a predetermined margin of tolerance for slightly longer than normal outages. When the lost link (if a relatively temporary one) comes back up, the respective POP agents send the accumulated reports of their extended memory spaces to the SaaS provider 140 and then clear and return to local free space, the memory capacity of their buffer space extensions. If the duration of the link loss is greater than the respectively historically normal durations plus predetermined margins of tolerance, control passes to step 260.

Referring to step 260, in one embodiment, if the link loss exceeds a predetermined duration or if the cliental server has crashed or lost power, then a server reboot is automatically carried out, for example under control of a local time-out watchdog apparatus at the cliental server site (e.g., LocXn) or because one of the POP agents is authorized to take such a drastic action as initiating a server reboot. Upon reboot, the browser is re-launched at step 222 and attempts are made to download new (up to date) web pages as POP agents for the rebooted cliental server (e.g., 31n). In one embodiment, the reboot operation is intentionally delayed so that in the interim, the SaaS provider 140 can change the web pages (and thus the POP agents) that will be downloaded following the server crash or prolonged loss of communication link or intentional reboot.

Referring to step 255, in one embodiment and for example when there is an unusually long loss of communication with a first SaaS provider web site (e.g., hosted by server 144a), one or more of the currently installed POP agents (e.g., A1-An) is authorized to automatically determine from its side (without obtaining confirmation authorization from the SaaS provider side (LocSaaS)) to replace itself with lost-link-handling version by requesting download (e.g., from a predetermined back up web site, for example one hosted by server 144b) of a substitute web page (one having browser-executable code) or to actuate replacement of another POP agent by requesting download of a substitute web page (e.g., from a predetermined back up web site) for another of the open tabs or to open a new tab and request download of an additional POP agent into that new tab where the substitute or new POP agents use alternate communication paths for connecting with back-up SaaS provider locations. In cases where such replacements/new-installments occur, control for the corresponding tabs is passed to step 223 where the alternate communication paths are used. On the other hand, if it is determined that the current communication paths are operative within predetermined margins of failure tolerance and no new web page downloads are now needed, control returns to step 240 where the currently activated POP agents continue to automatically and repeatedly monitor and report on their respectively assigned areas of concern (e.g., local hard disk utilization rates, local communication module utilization rates, etc.) and/or continue to automatically and repeatedly request and receive either null commands or browser-executable commands from their respective web hosting portions of the SaaS provider 140.

Referring to FIG. 3, shown is a method 300 for installing additional cliental servers. Entry 305 represents the generating of a service ticket for installing a new cliental server at a specified remote site (e.g., LocXn). The service ticket may have been automatically generated by an analytics server portion of and at the SaaS site (LocSaaS), where the analytics server portion has automatically determined, based on monitoring reports received from already executing POP agents (e.g., A1-An) that additional hardware resources are need at the specified remote site (e.g., LocXn) due to, for example, growing business demands, known degradation of already installed hardware and known emerging problems that can be remedied by adding on more or newer hardware and/or software supported by such newer hardware. The added new hardware may include, but is not limited to: larger/faster magnetic and/or opto-magnetic disc storage, larger/faster solid state data (SSD) storage devices; larger/faster multi-core CPU's; larger/faster wired or wireless, optical or electronic data communication modules; and so on.

At step 310 an SaaS technician brings a new Cliental Server (e.g., 31(n+1)—not shown) to remote location LocXn, hooks it up to the local network and powers it Up. The new Cliental Server (e.g., 31(n+1)) is preloaded with an OS, a cooperatively integrated Browser, one or more sandbox exceeding plug-ins such as for running Java Applets and ActiveX code) and one or more Startup Scripts among which at least one that will automatically request page serves from the SaaS servers (e.g. 144a, 144b) upon startup. Alternatively or additionally, the SaaS technician may brings a new or replacement hardware module (e.g., disk drive) for added installation into or substituting installation into an already present server box. In that case, the already present server box is pre-loaded from the SaaS provider site (140) with appropriate Startup Scripts for activating the new/replacement hardware and for installing appropriate POP agents for monitoring and/or managing the new/replacement hardware. Alternatively, the technician may physically bring with him/her, a flash drive or other data supplying device for copying in the desired Startup Scripts for activating the new/replacement hardware and for installing appropriate POP agents for monitoring and/or managing the new/replacement hardware.

At step 320 the powering up new Cliental Server (e.g., 31(n+1) or pre-existing server with installed new/replacement hardware) executes step 210 of process 200 (FIG. 2) and the steps that follow. The technician need not have anything more that needs to be done by way of installing POP agents into the new Cliental Server. Thus manual labor is minimized and errors due to manual installation of POP agents are avoided.

Referring to FIG. 4, shown is a method 400 that may be carried out at the SaaS side. The technician at the remote location need not do anything except wait for a notification from the SaaS provider center 140 that he is free to go. Step 405 represents the technician's powering up of the new or hardware-wise revised cliental server.

At step 410 the SaaS web pages server receives request(s) from the newly installed and powered up Cliental Server (e.g., 31(n+1)—not shown) or from the rebooted but hardware-wise revised cliental server for URL specified web pages. At step 420 the SaaS web pages server notes that this is the first time ever for such request(s) from this self-identifying new Cliental Server or hardware-wise revised cliental server. the SaaS web pages server downloads a corresponding set of first-time POP agents (e.g., ones corresponding to the revised hardware and/or software setup) and records in a log for the new Cliental Server (e.g., 31(n+1) or the hardware-wise revised cliental server that the first time POP agents corresponding to the hardware plus optional software revisions have been downloaded. At step 430 the SaaS web pages server verifies that the downloaded POP agents are up and running, for example by detecting that expected checking-in pings and/or monitoring reports are received from each and every one of them. If No, step 420 is repeated.

If step 430 indicates that Yes, all the first-time POP agents are installed and up and running then an email and/or other notification (e.g., automated telephone call) is automatically sent to the on-site technician at transition 435 letting him/her know he/she is free to go. If repetition of steps 420 and 430 for more than a predetermined number of times fails to get all the first-time POP agents installed and up and running then an email and/or other notification (e.g., automated telephone call) is automatically sent to the on-site technician at transition 435 giving him/her alternate instructions (e.g., try swapping in a different hardware box).

At step 440, after a Yes has been received from transition 435 and the technician has left the installation site (e.g., LocXn), the SaaS web pages server may receive not-first time request(s) from the recently installed and powered up Cliental Server or hardware-wise revised server. At step 450, the SaaS web pages server notes from its activities log for that Cliental Server (e.g., 31($n$+1)—not shown) that this is NOT the first time ever for such request(s) from this Cliental Server. In response, the SaaS web pages server downloads corresponding post first-time POP agents and records in the log which post first time POP agents have been downloaded. At step 460 the SaaS web pages server verifies that the downloaded POP agents are up and running, for example by detecting that expected checking-in pings and/or monitoring reports are received from each and every one of them. If No, step 450 is repeated. Transition 465 represents subsequent actions by the SaaS web pages server where these subsequent actions may include additional downloads of context-specific POP agents or commanded re-configurations of the cliental server by use of one or more of the installed POP agents.

The present disclosure is to be taken as illustrative rather than as limiting the scope, nature, or spirit of the present teachings. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated and taught here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Further, the functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "component," "block", "database", "agent" or "system." Furthermore, aspects of the present disclosure may take the form of a computer program product embodied in one or more non-ephemeral computer readable media having computer readable and/or executable program code embodied thereon.

Any combination of one or more computer readable media may be utilized. The computer readable media may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an appropriate electrical connection having one or more wires, a portable computer diskette, a hard disk, a random access memory (RAM), a read-only memory (ROM), an erasable programmable read-only memory (EPROM or Flash memory), an appropriate optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Java Applets, JavaScript, AvtiveX, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct/program a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope include that defined by the claims appended hereto.

What is claimed is:

1. A machine-implemented, remote monitoring method comprising:
   automatically causing a continuous running in a to-be-monitored first server having a pre-installed first operating system, of a pre-installed first browser that is configured for cooperative interaction with the installed first operating system, the pre-installed first browser being configured to enable browser-executed code to access hardware resources and/or other software resources of the first server;
   automatically causing the continuously running first browser to request from a remote and pre-specified SaaS provider, download of at least one web page containing browser-executable code that is executable by the first browser and can access hardware resources within a domain of the first operating system, the browser-executable code being configured to automatically repeatedly monitor one or more operational attributes of the to-be-monitored first server and to automatically repeatedly report to the remote pre-specified SaaS provider on the results of the monitoring of the first server; and
   automatically causing a verifying that the requested at least one web page has successfully downloaded into the first server, and if yes activating the browser-executable code of the at least one web page so as to thereby initiate the corresponding automatically repeated monitoring of the one or more operational attributes of the first server and the corresponding automatically repeated reporting to the remote pre-specified SaaS provider on the results of the monitoring.

2. The machine-implemented method of claim 1 wherein the browser-executable code includes JavaScript code and wherein the method further comprises:
   installing a plug-in that enables the JavaScript code to access hardware resources within the domain of the first operating system.

3. The machine-implemented method of claim 1 and further comprising:
   automatically causing a continuous running in a to-be-monitored second server having a pre-installed second operating system, of a pre-installed second browser that is configured for cooperative interaction with the installed second operating system, the second operating system being different than the first operating system;
   automatically causing the continuously running second browser to request from the remote and pre-specified SaaS provider, download of at least a second web page containing browser-executable code that is executable by the second browser and can access hardware resources within a domain of the second operating system, the browser-executable code of the at least second web page being configured to automatically repeatedly monitor one or more operational attributes of the to-be-monitored second server and to automatically repeatedly report to the remote pre-specified SaaS provider on the results of the monitoring of the second server; and
   automatically causing a verifying that the requested at least second web page has successfully downloaded into the second server, and if yes activating the browser-executable code of the at least second web page so as to thereby initiate the corresponding automatically repeated monitoring of the one or more operational attributes of the second server and the corresponding automatically repeated reporting to the remote pre-specified SaaS provider on the results of the monitoring of the second server.

4. The machine-implemented method of claim 3 wherein the automatically repeated monitoring of the one or more operational attributes of the second server include monitoring of performance attributes of one or more data storage units within the second server.

5. The machine-implemented method of claim 4 wherein the automatically repeated monitoring of the one or more operational attributes of the second server include monitoring of performance attributes of one or more data processing units within the second server.

6. The machine-implemented method of claim 5 wherein the automatically repeated monitoring of the one or more operational attributes of the second server include monitoring of performance attributes of one or more data communication units within the second server.

7. The machine-implemented method of claim 3 wherein the automatically repeated monitoring of the one or more operational attributes of the first server include monitoring of performance attributes of one or more data storage units within the first server.

8. The machine-implemented method of claim 1 wherein the automatically repeated monitoring of the one or more operational attributes of the first server include monitoring detection within the first server of embedded meta-data received from end-user devices.

9. The machine-implemented method of claim 1 and further comprising:
allowing the browser-executable code of the at least one web page to request download from the pre-specified SaaS provider of a different web page having respective different browser-executable code, where the requested different web page, when downloaded into the first server will replace the at least one web page.

10. The machine-implemented method of claim 1 and further comprising:
allowing the browser-executable code of the at least one web page to initiate a reboot of the first server.

11. One or more data storage devices storing computer-readable data, the stored computer-readable data being configured to cause a specified one or more data processing units to carry out a machine-implemented method, the method comprising:
automatically causing a continuous running in a to-be-monitored and network-connected first server having a pre-installed first operating system, of a pre-installed first browser that is configured for cooperative interaction with the installed first operating system, the pre-installed first browser being configured to enable browser-executed code to access hardware resources and/or other software resources of the first server;
automatically causing the continuously running first browser to request from a remote and pre-specified SaaS provider that is coupled to the network, of a download of at least one web page containing browser-executable code that is executable by the first browser and can access hardware resources within a domain of the first operating system, the browser-executable code being configured to automatically repeatedly monitor one or more operational attributes of the to-be-monitored first server and to automatically repeatedly report by way of the network to the remote pre-specified SaaS provider on the results of the monitoring of the first server; and
automatically causing a verifying that the requested at least one web page has successfully downloaded into the first server, and if yes activating the browser-executable code of the at least one web page so as to thereby initiate the corresponding automatically repeated monitoring of the one or more operational attributes of the first server and the corresponding automatically repeated reporting to the remote pre-specified SaaS provider on the results of the monitoring.

12. The one or more data storage devices of claim 11 and further wherein the machine-implemented method comprises:
allowing the browser-executable code of the at least one web page to request download from the pre-specified SaaS provider of a different web page having respective different browser-executable code, where the requested different web page, when downloaded into the first server will replace the at least one web page.

* * * * *